United States Patent [19]

Auffret et al.

[11] Patent Number: 5,235,452

[45] Date of Patent: Aug. 10, 1993

[54] PROCESS AND SWITCHING MATRIX APPARATUS FOR OPTICAL TRANSMISSION OF SIGNALS BY SELF-HETERODYNING

[75] Inventors: René Auffret, Perros-Guirec; Jean Le Bihan, Brest; Georges Claveau, Camlez, all of France

[73] Assignee: Minister of the Post Telecommunications and Space (Centre National d'Etudes des Telecommunications), Issy Les Mouhineaux, France

[21] Appl. No.: 845,807

[22] Filed: Mar. 9, 1992

Related U.S. Application Data

[63] Continuation of Ser. No. 531,442, May 31, 1990, abandoned.

[30] Foreign Application Priority Data

Jun. 2, 1989 [FR] France ............... 89 07316

[51] Int. Cl.⁵ ............... H04J 14/02; H04B 10/00
[52] U.S. Cl. ............... 359/125; 359/154; 359/165; 359/181; 385/17
[58] Field of Search ............... 359/154, 181, 191, 157, 359/165, 128, 125, 164, 109; 385/17

[56] References Cited

U.S. PATENT DOCUMENTS

| | | | |
|---|---|---|---|
| 4,530,084 | 7/1985 | Strebel et al. | 370/3 |
| 4,530,084 | 7/1985 | Strebel et al. | 370/3 |
| 4,580,291 | 4/1986 | ab der Halden | 455/612 |

FOREIGN PATENT DOCUMENTS

| | | | |
|---|---|---|---|
| 0131818 | 1/1985 | European Pat. Off. | 370/3 |
| 0131818 | 1/1985 | European Pat. Off. | |
| 0317352 | 5/1989 | European Pat. Off. | |
| 0317352 | 5/1989 | European Pat. Off. | 370/3 |
| 3237845 | 8/1983 | Fed. Rep. of Germany. | |
| 1487054 | 6/1967 | France. | |

OTHER PUBLICATIONS

Soviet Journal of Quantum Electronics, vol. 15, No. 9, Sep. 1985, Woodbury, N.Y., US; S. K. Morshnev et al.: "Coherent fiber-optic communications (review)", pp. 1183-1197.

IEEE Journal of Quantum Electronics, vol. QE-20, No. 4, Apr. 1984, New York, US; N. A. Olsson et al.: "An Optical Switching and Routing Lasers" pp. 332-334.

Primary Examiner—Edward L. Coles, Sr.
Assistant Examiner—Kinfe-Michael Negash
Attorney, Agent, or Firm—Oblon, Spivak, McClelland, Maier & Neustadt

[57] ABSTRACT

A process for optical transmission by self-heterodyning and a transmission system with a switching matrix using the process. The process consists in transmitting optical signals to one or more receivers of N, from optical transmission means including an optical signal emitting device for modulation by frequency transposition, and an optical fiber connection. Also included in the process is the transmission a given signal on one or more carrier frequencies respectively to one or more receivers, the obtaining of the carrier frequency or frequencies by transposition of an emission frequency by one or more modulation frequencies which are distinct and can be selected as a function of the receiver or receivers, and the transmission of the emission frequency signal on the same optical connection.

14 Claims, 4 Drawing Sheets

PROCESS AND SWITCHING MATRIX APPARATUS FOR OPTICAL TRANSMISSION OF SIGNALS BY SELF-HETERODYNING

This application is a continuation of application Ser. No. 07/531,442, filed on May 31, 1990, now abandoned.

BACKGROUND OF THE INVENTION

1. Field of the Invention

This invention relates to a process for optical transmission of signals by self-heterodyning and a transmission system with a switching matrix using such a process.

2. Discussion of Background

A system for transmission by self-heterodyning consists, as can be seen in FIG. 1, of an emission means, a transmission means, and a reception means.

The emission means include a monofrequency laser 1 controlled by feed circuits 2 followed by a collimator 3 to collimate the beam emitted by the monofrequency laser. These means further comprise an acoustooptic modulator 4 energized by a frequency generator, to separate the incident beam in two separate beam. The beam is divided into a nondeflected beam following path B and having the same frequency as the incident beam and into a deflected beam following path A and of a frequency equal to the frequency of the incident beam plus or minus the excitation frequency of the acoustooptic modulator. The + or − sign depends on the relative movement of the optical and acoustic waves.

An electrooptic modulator 7 makes it possible to amplitude modulate the deflected optical signal.

At the output of the modulator, the optical signal is delayed by a polarization-preserving fiber 8. This delay T is greater than or equal to $1/\Delta F$, $\Delta F$ being the spectral width of the emission of laser 1. The signal then passes into a polarization controller 9.

This polarization controller 9 makes a final adjustment of the polarization direction of the beam of path A on that of path B.

The output of polarization controller 9 is connected to an arm of an optical mixer 11.

The nondeflected beam is focused by a lens 16 in the second arm of mixer 11.

The two waves of paths A and B, at the output of mixer 11, have the same polarization direction.

These signals are carried by the transmission means which consist of a monomode transmission fiber 12.

The reception means consist of a quadratic photodetector 13 followed by an amplifying and demodulating circuit 14.

The mixing of the two waves is performed at the level of the quadratic detector which detects the beat signal at intermediate frequency f1 which is the same frequency used to control acoustooptic modulator 4.

This signal with intermediate frequency f1 contains the data provided by amplitude modulator 7. This data is extracted from the signal with intermediate frequency f1 by amplifying and demodulating circuits 14.

Since the frequencies transmitted on path A containing the data-carrying signal and on path B containing the signal from the local oscillator are very close, the modifications of the polarization directions produced by the transmission fiber are identical for the two beams which are found with polarization directions at the level of photodetector 13.

When it is desired to increase the power of the local oscillator, a traveling wave optical amplifier 15 is placed on path B in the emission means.

The means of reception by "standard" heterodyne detection therefore comprise a local oscillator delivering a wave at such a frequency that the mixing of the data-carrying incident signal and the signal from the local oscillator makes it possible to obtain a wave at the intermediate frequency. To obtain a perfectly stabilized wave, it is necessary to use an automatic frequency control to act on the optical frequency of the local oscillator to stabilize it.

On the other hand, it is necessary that the polarization direction of the two optical waves be the same for the two incident and local waves. Since the optical fiber does not maintain this direction, it is usual to use, at reception, a circuit to correct and control the incident polarization. It can involve either a polarization controller or a double detection with polarization diversity.

This invention has as its object to eliminate these drawbacks. It further makes it possible to simplify the reception equipment. This advantage is significant in transmission systems with a switching matrix, such systems being used for local networks, because it leads to a reduction in the amount of subscriber equipment required.

SUMMARY OF THE INVENTION

This invention therefore has as its object a process for optical transmission of signals by self-heterodyning to one or more of N receivers, from an optical transmission means comprising an optical signal emission means, a modulation means by frequency transposition, and a connection by optical fibers, characterized in that the process includes the steps of:

transmitting a given signal on one or more carrier frequencies respectively to one or more receivers, obtaining the carrier frequency or frequencies by transposition of an emission frequency by one or more modulation frequencies which are distinct and can be selected as a function of the receiver or receivers, and transmitting the emission frequency signal on the same optical connection.

According to a first aspect of the invention, the process consists, at emission, of:

using a multifrequency generator to generate one to N modulation frequencies, using an acoustooptic modulator to transpose the emission frequency signal on a carrier frequency, selecting a modulation frequency from said N modulation frequencies, controlling the acoustooptic modulator with the selected modulation frequency, transmitting the given signal from the carrier frequency to the addressee receiver of N receivers.

According to a second aspect of the invention, the process consists, at emission, of:

using a multifrequency generator to generate N modulation frequencies, using an acoustooptic modulator to transpose the emission frequency signal on N carrier frequencies, selecting N modulation frequencies, controlling the acoustooptic modulator with the skeletal N modulation frequencies, transmitting the given signal from the N carrier frequencies to N addressee receivers.

According to a third aspect of the invention, the emission frequency signal is obtained from a monofrequency laser.

According to a fourth aspect of the invention, the process consists, at emission, of placing an optical concentrator on the path of the waves deflected by the acoustooptic modulator.

According to a fifth aspect of the invention, the process consists, at emission, of placing an electrooptic modulator on the path of the signals transposed in frequency to modulate these transposed signals in amplitude, with this modulation corresponding to the actual data to be transmitted.

According to a sixth aspect of the invention, the process consists, at emission, of placing an optical mixer on the path of the signals transposed and modulated in amplitude and on the path of the emission frequency signal not deflected by the acoustooptic modulator, which delivers these signals with the same polarization direction.

According to a seventh aspect of the invention, the process consists of transmitting the signals coming from the emission means on a monomode fiber.

According to an eighth aspect of the invention, the process consists, at reception, of placing in each receiver a demodulator locked on a frequency corresponding to one of the modulation frequencies.

According to a ninth aspect of the invention, the process consists, at reception, of placing a distributor at the input of the receiver.

The invention also consists of a transmission system with a switching matrix, intended to transmit signals from a subscriber set of N to another subscriber set of N−1, wherein the system includes:

an optical transmission means,

N emission units, each unit being able to emit a given signal on any of N carrier frequencies, to obtain the desired carrier frequency by transposition of an emission frequency by a modulation frequency selected as a function of the addressee subscriber set, and also able to emit the emission frequency signal to the transmission means, means for controlling modulation frequencies able to apply any of N modulation frequencies to any of N emission units, a calling generator able to send, to the input of the emission unit assigned to the called subscriber, calling data making it possible for the control means to assign the desired modulation frequency to a unit and the suitable amplitude modulation signal.

According to another aspect of the invention, each subscriber set is equipped with a demodulator locked on an intermediate receiving frequency corresponding to a particular modulation frequency.

According to another aspect of the invention, the control means of the frequencies consist of N oscillators which can be addressed on N frequencies.

According to another aspect of the invention, each emission unit includes a monofrequency laser, an acoustooptic modulator, an optical concentrator, an optical mixer, an amplitude modulator, and a polarization controller.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
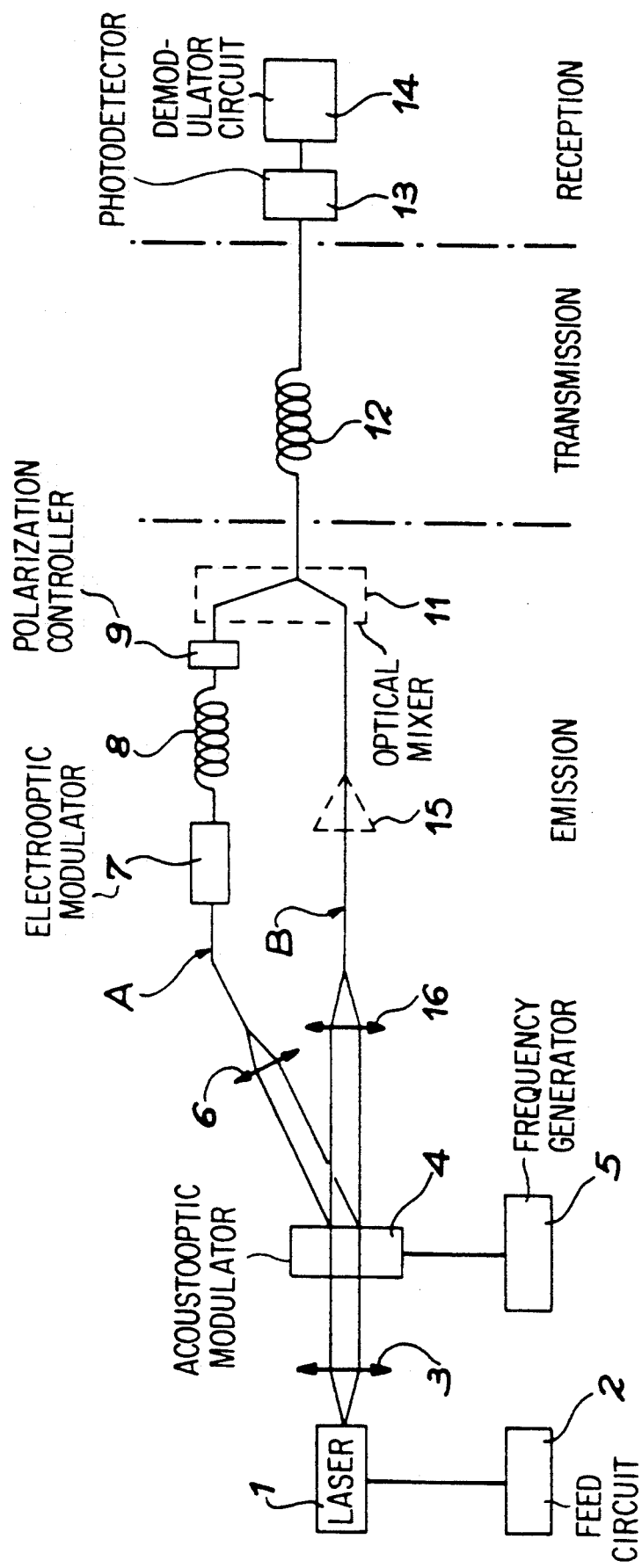
FIG. 1 shows a device for transmission by self-heterodyning according to the prior art.

Referring now to the drawings, wherein like reference numerals designate identical or corresponding parts throughout the several views and more particularly to FIG. 2 thereof, there is shown a device for transmission by self-heterodyning making it possible to use the transmission process according to the invention.

This device makes it possible to transmit optical signals to one or more receivers Ab1–AbN of N.

This device comprises a transmission means consisting of an optical fiber 90 and an emission unit consisting of an optical signal emission means, and a means for modulation by frequency transposition.

The emission means comprise a monofrequency laser 10.

The modulation means comprise an acoustooptic modulator 20.

The emission unit further comprises a concentrator formed by a fiber comb 30 and a mixer 40. This unit also comprises an amplitude modulator 50, a polarization-preserving fiber 60, a polarization controller 70, and a mixer 80.

Emission frequency $f_o$ of monofrequency laser 10 undergoes a transposition produced by modulator 20. For this purpose, modulator 20 receives a desired frequency signal, provided by a frequency generator 21. This frequency is the modulation frequency.

According to the invention, the modulation frequency is selected as a function of the addressee subscriber to whom a particular frequency N will be assigned.

Thus, modulation frequency F1 is selected for the subscriber to whom this frequency F1 has been assigned, and frequency FN is selected for the subscriber to whom frequency FN has been assigned.

In case it is desired to send the same signal to the group of N subscribers, N modulation frequencies F1–FN are selected.

The beam emitted by monofrequency laser 10 controlled by its feed circuits (not shown) passes through acoustooptic modulator 20 energized by frequency generator 21.

The incident beam is separated in two at the output of modulator 20. The deflected beam follows path A while the nondeflected beam follows path B.

The nondeflected beam has the same frequency as the incident signal. The deflected beam has a frequency equal to that of the incident beam plus or minus the modulation frequency (excitation frequency of the acoustooptic modulator).

Each time that the modulation frequency of the acoustooptic modulator is changed, not only is the frequency of the deflected beam changed but also its direction $\theta m$ which is equal to arc sine $\lambda$, $\lambda$ being the wavelength of the light, $\Omega$ the pitch of the acoustic grid in the modulator, $\Omega$ being given by the relation $\Omega = v/F$, where v is the propagation speed of the acoustic waves in the material, F the modulation frequency (in practice, F is either F1 or F2, ..., or FN) and corresponds to the intermediate frequency at the level of the detection at reception.

For N discrete intermediate frequencies, N modulation frequencies therefore are available producing N directions for deflected beam ($\theta_1, \ldots \theta_n$).

A suitable lens focuses the beams in fiber comb 30 and mixes them on a single fiber in mixer 40.

When all the frequencies are addressed simultaneously, the same data is recovered simultaneously on N intermediate frequencies.

When the modulator is addressed sequentially, the same data channel can be distributed sequentially on the various intermediate frequencies.

The data-carrying signal is obtained as described in connection with FIG. 1, i.e., by amplitude modulation.

The transmission device further comprises the emission unit and the transmission line, a reception unit consisting of N receivers of the subscribers and a distributor 100 making it possible to distribute the signal transmitted to N subscribers.

Figure 2A:
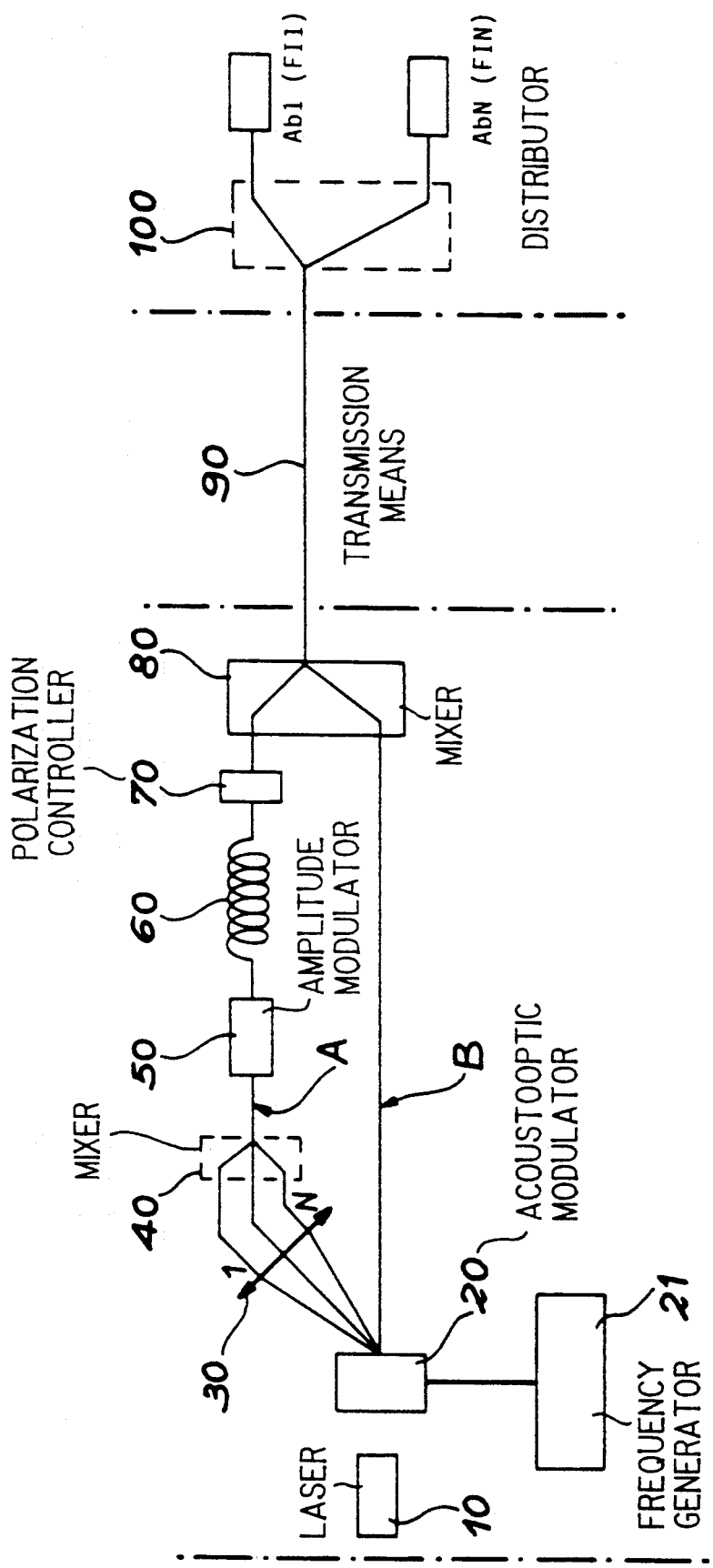
FIG. 2a shows the diagram of a device making it possible to use the process according to the invention.
Figure 2B:
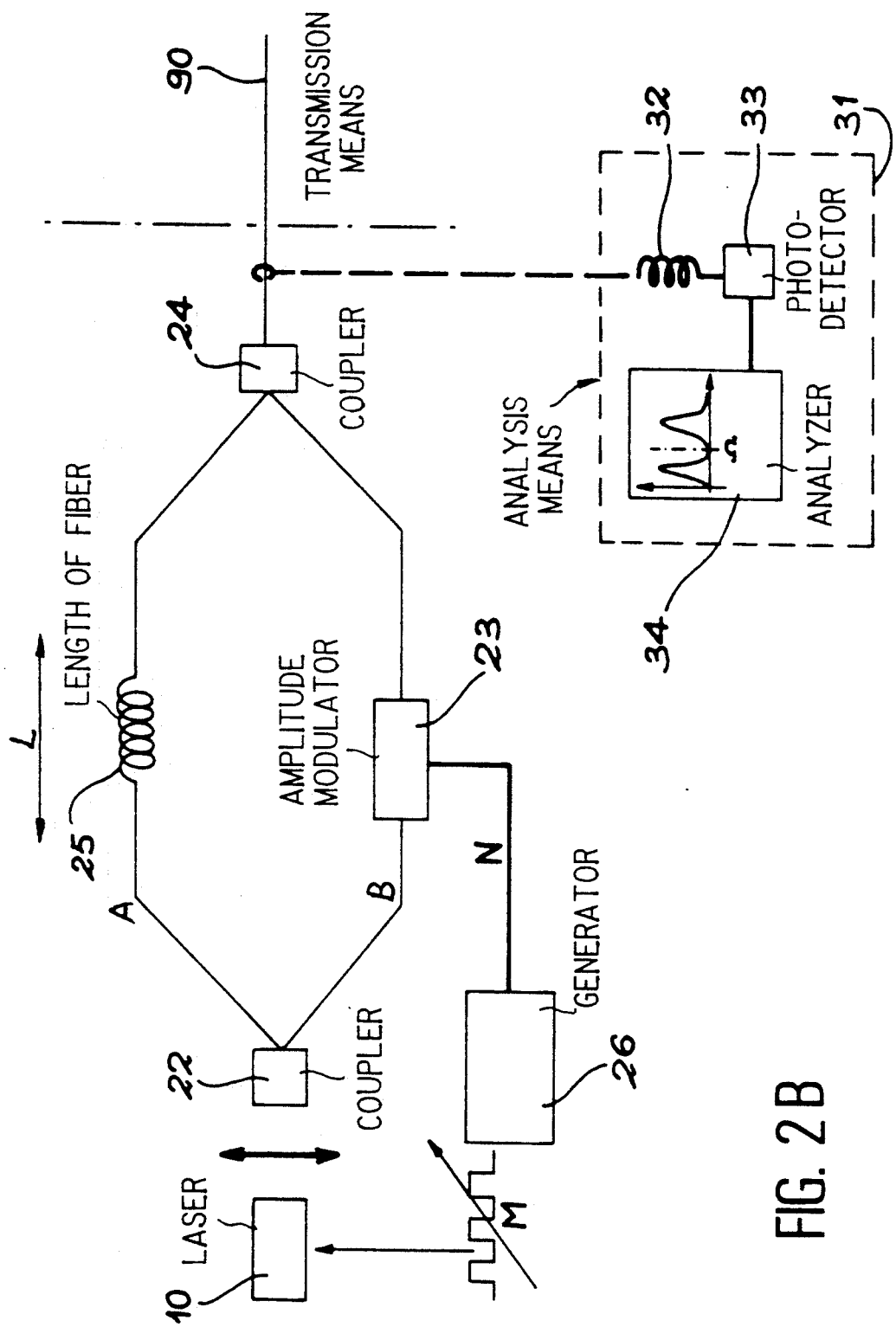
FIG. 2b is a diagram of an alternate embodiment of a device for using the process according to the invention.

In FIG. 2B, the light emitted by a single-frequency semiconductor laser 10 is injected into a coupler 22. In one of the legs A of the coupler there is a length L of fiber 25 such that L>1c (length of coherence of the laser source). Amplitude modulator is placed in leg B. The signals of the two legs are combined in coupler 24 and routed to transmission means 90 (or to photodetector 33).

When the laser is modulated by periodic rectangular signals M of adjustable amplitude, whose period t satisfies the previously expressed condition t=2T/(2N+1) (T time delay induced by fiber 25, T=L*n/c#5ns/m), a shift of the autocorellation spectrum of the laser is observed in analyzer 34 such that the larger the shift the greater the amplitude of signal M. Thus, a frequency translator has been produced.

The advantage of this new solution in relation to that of the acoustooptical modulator is as follows: elimination of the acoustooptical modulator, of the collimation optics 30 and of coupler 40 of FIG. 2A. On the other hand, the frequency range generated by the laser is greater than the one obtained with acoustooptical modulator. Currently, ranges greater than gigahertz are obtained for amplitudes of modulation of several milliamperes. This point is of prime importance because it controls, for a given output, the number of subscribers that can be addressed. Nab=delta F/2B (delta F: frequency range of the laser, B: band of transmitted signals).

This solution, however, necessitates certain constraints on the digital signal carrying the information; they will be analyzed in detail below.

When a signal N is applied to amplitude modulator 23 that is synchronous with the one M that is applied to the laser, the optical signal coming from leg B comprises no more than a single optical frequency OF or F1 depending on the relative phase of the laser modulations and of the amplitude modulator. Frequency F1 corresponds to the frequency of the laser for the strong modulation currents and FO for the weak currents. When it is assumed that the modulation applied to modulator 23 is such that the signal of leg B comprises only component F1, it is in opposition with the signal of leg A, a signal which comprises sometimes frequency F1, sometimes FO, and this measured by the modulation of the laser.

Means 31 for analysis of the spectrum make it possible to understand better the phenomena of frequency transposition obtained by this variant.

Description of the states of the photodetector:
1) The signal of leg B emits F1 which pulsates with signal FO of leg A and, after detection, generates a signal at frequency F=F1−FO,
2) During the following half-period, there is no signal emitted by leg B; therefore, there cannot be any pulsation with signal FO emitted by A at the same moment. The resulting signal periodically exhibits a signal of frequency F=F1−FO, spaced with periods without a signal. The variation of the amplitude of the laser current changes frequency F.

When, instead of applying to modulator 23 a recurrent signal, an NRZ digital signal N is applied whose clock frequency is synchronous with the one applied to the laser, all the frequencies of the spectrum of the NRZ signal are submultiples of the clock and therefore satisfy the initial condition (2N+1)t=T up to the limit t=2T which corresponds to the lowest frequency that can be transmitted. The NRZ code can exhibit long series of "1" or of "0," corresponding to components BF, scrambling makes it possible to remedy this defect. Other codes can be envisaged to the extent that all the bits are in phase with the clock, the RZ code for example.

The M and N signals are generated by generator 26.

Relation between the spectral width of the laser and the minimum transmittable frequency:
length of coherence of the laser: 1c=c/delta F (c: speed of light),
time delay in the fiber: T=1c*n/c=n/delta F (n: index of the fiber),
limit condition: t=2T.

Relation between the period of the minimum frequency and the spectral width of the laser:

$$t = 2*n/\text{delta F}$$

The element described above represents the equivalent of the "EMISSION" function described pertaining to FIG. 2A. The general diagram of the switching network FIG. 3 is identical in the case of this variant embodiment, except that the amplitude of the signals which modulate the lasers of the various emission units is managed instead of the frequencies of the acoustooptical modulators.

Figure 3:
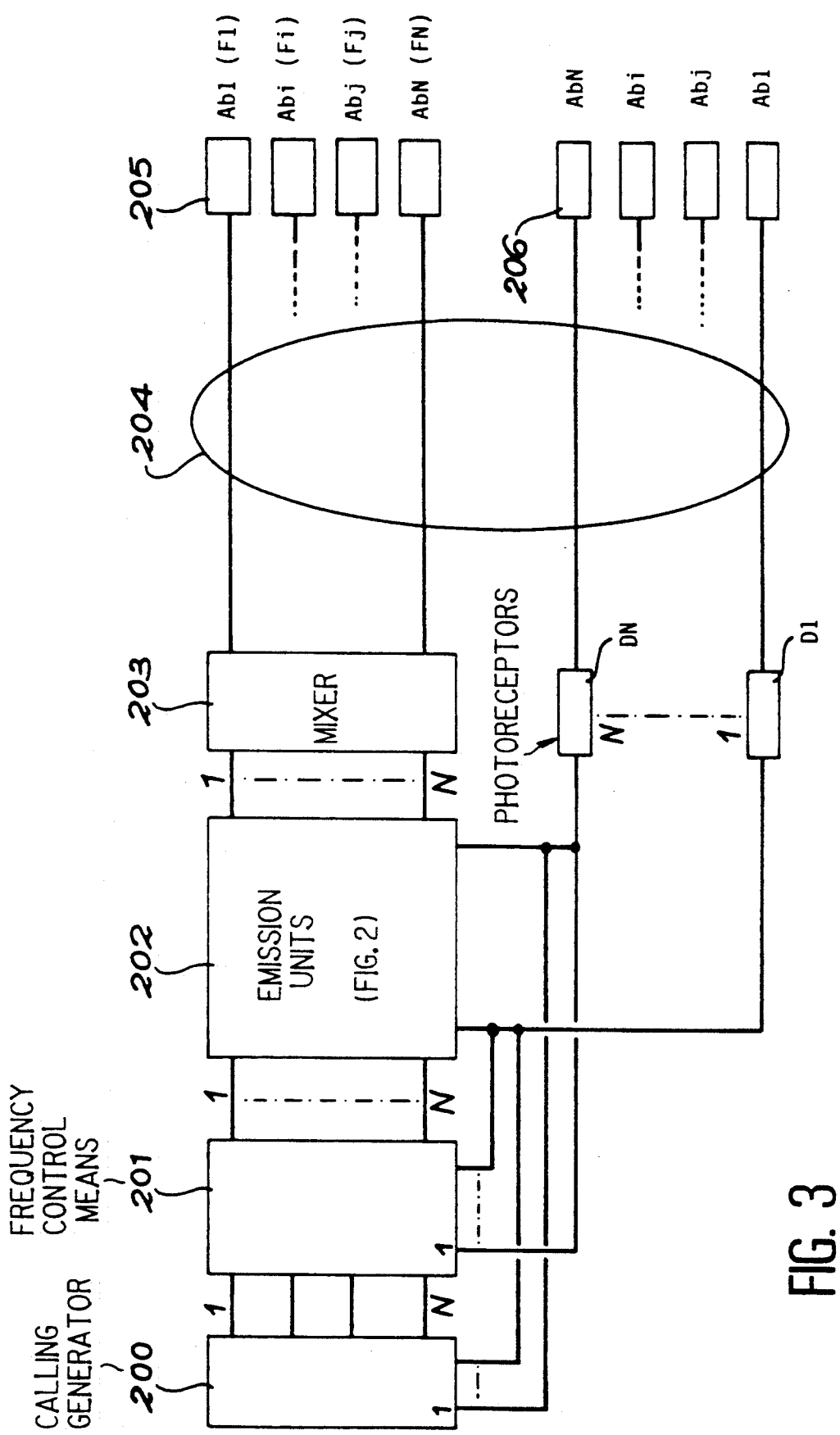
FIG. 3 shows the diagram of a transmission system according to the invention.

FIG. 3 shows a transmission system according to the invention, in which the transmission process is applied which was just described and illustrated by the diagram of FIG. 2.

This transmission system comprises a frequency switching matrix which makes it possible to transmit signals from a subscriber set Abi of N to another subscriber set Abj of N−1 other subscribers.

The system comprises means for optical transmission of signals.

It further comprises N emission units able to emit a given signal on any N carrier frequencies. N emission units are grouped in block 202. Each unit corresponds to such a unit as described in connection with FIG. 2.

The system further comprises frequency control means 201 making it possible to generate and to assign modulation frequency or frequencies F1−FN applied to the acoustooptic modulators of any of N emission units, constituting block 202.

The system also comprises a calling generator 200 able to send, to the inputs of the frequency control means, calling data making it possible for these means to assign the desired modulation frequency to an emission unit and the suitable amplitude modulation signal.

Each emission unit of block 202 is able to receive any of N modulation frequencies, and any of N calling signals coming from the sets of the subscribers.

Each subscriber set Abi comprises a generating part of a calling code grouped under reference 206 and a detection part grouped under reference 205. Of course, these two parts (detection and generation of the calling code) are, in practice, in each subscriber set.

The system further comprises a calling code detector D1—DN placed on the path of the signals of each subscriber set.

These detectors consist of photoreceptors and the output signal is used to control calling generator 200, frequency control means 201 and the amplitude modulation inputs of the emission units of block 202.

The system further comprises a mixer 203 making it possible to mix the signals coming from each emission unit of the block on an optical fiber of grid 204.

Element 002 consequently makes it possible to produce a frequency switching matrix N×N. Each of N emission units makes it possible to be addressed to each of N−1 other subscribers by selection of a modulation frequency corresponding to the intermediate detection frequency of the addressee subscriber.

The control means consist of N oscillators which can be addressed on N frequencies. The calling generator consists of logic gates making it possible to make frequency Fj of subscriber Abj correspond to the emission unit of a calling subscriber Abi.

The establishment of a communication takes place in the following manner.

Subscriber Ai calls subscriber Aj by his rising channel, the control element from the data received assigns the frequencies to the acoustooptic modulators of the emission blocks of subscribers Ai and Aj, Fj for Ai and Fi for Aj. The calling signal is sent to subscriber Aj who can communicate on picking up of his set.

Actually, if subscriber Ab1 wants to communicate with subscriber AbN, for example, he emits from emission part 206 to communication center 202. His signal first of all is transposed optoelectrically by photoreceptor 207, then directed to the emission unit of block 202, which is assigned to him, and to frequency control element 201.

This control center assigns frequency FN of the called subscriber to the emission unit of subscriber Ab1, and frequency F1 of the calling subscriber to the emission unit of called subscriber AbN.

Concurrently, call-generating element 200 sends to the input of the emission unit of the calling subscriber locked on frequency FN the calling data which will be detected by receiver 205 of the called subscriber. On picking up, the connection is established since the frequencies of the emission blocks of the calling and called subscribers have been assigned previously.

Two subscribers Ab1 and AbN being in communication, nothing stands between two other subscribers separate from the first two subscribers simultaneously communicating and so on.

In the system described, each emission unit operates on request on one or the other of N frequencies. Another structure where the emission units operate on several frequencies simultaneously can be considered. In this case, each emission block can be distributed to all the subscribers.

Another hypothesis can be considered where each emission unit has a single frequency but where each subscriber has a tunable reception and can receive N frequencies; a distribution grid where each input of emission block 202 receives not the signals emitted by the subscribers but a source program then can be produced. N source programs then can be distributed to N subscribers.

Of course, the emission frequencies of lasers are chosen from the emission units are different enough so that the resulting optical beats cannot interfere with the receiving frequencies of the various subscribers. It is sufficient for this purpose that the difference of emission frequencies from various lasers be greater than the highest intermediate receiving frequency. This poses very little problem in practice since a difference in wavelength of one angstrom corresponds to a frequency difference of 12 to 13 GHz depending on whether work is at 1.3 or 1.5 microns, which has a greater width than the intermediate frequencies that can be obtained from an acoustooptic modulator.

We claim:

1. A method for optical transmission of signals by self-heterodyning to at least one receiver from an optical transmission means, said transmission means including an optical signal emission means, a frequency transposition modulation means, and an optical fiber connection, said method comprising the steps of:

providing at least one carrier frequency by transposition wherein an emission frequency undergoes a transposition by at least one modulation frequency, said emission frequency and said modulation frequency being distinct frequencies and wherein said modulation frequency is selected as a function of one of said at least one receiver to which a particular frequency is assigned, providing a first signal which is a data carrying signal obtained by amplitude modulation on a respective one of said at least one carrier frequency and transmitting said first signal on said optical fiber connection to a respective one of said at least one receiver, transmitting a second signal having said emission frequency on said optical fiber connection.

2. Optical transmission method according to claim 1, comprising the further steps of:

using a multifrequency generator to generate one to N modulation frequencies, using an acoustooptic modulator to transpose the emission frequency signal on a carrier frequency, selecting a modulation frequency having a frequency N, controlling the acoustooptic modulator with said modulation frequency, transmitting said first signal on the carrier frequency to one of said at least one receiver which is an addressee receiver.

3. Optical transmission method according to claim 1, comprising the further step of:

using a multifrequency generator to generate N modulation frequencies, using an acoustooptic modulator to transpose the emission frequency signal on N carrier frequencies, selecting N modulation frequencies, controlling the acoustooptic modulator with said N modulation frequencies, transmitting said first signal from said N carrier frequencies to N addressee receivers.

4. Optical transmission method according to claim 1, wherein the emission frequency signal is provided by a monofrequency laser.

5. Optical transmission method according to claim 1, comprising the further step of, at emission, placing an optical concentrator on the path of the waves deflected by the acoustooptic modulator.

6. Optical transmission method according to claim 1, comprising the further step of, at emission, placing an electrooptic modulator on the path of the signals transposed in frequency to amplitude modulate said transposed signals, said modulation corresponding to the actual data to be transmitted.

7. Optical transmission method according to claim 1, comprising the further steps of, at emission, placing an optical mixer on the path of the signals transposed and amplitude modulated and on the path of the emission frequency signal not deflected by the acoustooptic modulator, which delivers said amplitude modulated and said not deflected signal with the same polarization direction.

8. Optical transmission method according to claim 1, wherein the signals coming from the emission means are transmitted on a monomode fiber.

9. Optical transmission method according to claim 1, comprising the further step of, at reception, placing in each receiver a demodulator locked on a frequency corresponding to one of the modulation frequencies.

10. Optical transmission method according to claim 1, comprising the further step of, at reception, placing a distributor at the input of the receiver.

11. A transmission system for transmitting signals from one subscriber set of N to another subscriber set of N−1 from among said set of N, said system comprising, successively between a calling generator and a network of fibers;
  frequency control means;
  a plurality of N emission means; and
  an optical transmission means, wherein said calling generator, said frequency control means, and said emission means are connected to a calling code detector; wherein:
  said plurality of N emission units form a frequency switching matrix, each of said emission units emitting a first signal on any of a plurality of N carrier frequencies wherein each unit includes a means for providing a desired carrier frequency by transposition wherein an emission frequency undergoes a transposition in a modulator by at least one modulation frequency wherein said modulation frequency is selected as a function of an addressee subscriber set, each of said emission units also including a means for emitting a second signal to said optical frequency means wherein said second signal has a frequency equal to said emission frequency;
  said frequency control means controlling said modulation frequencies for applying any one of N modulation frequencies to any one of said N emission units;
  said calling generator sending, to the input of an emission unit assigned to a called subscriber, calling data for controlling said control means to assign a desired modulation frequency to one of said units and for controlling the control means to also assign a suitable amplitude modulation signal to said one of said units.

12. Transmission system according to claim 11, wherein each subscriber set is equipped with a demodulator locked on an intermediate receiving frequency corresponding to a particular modulation frequency.

13. Transmission system according to claim 11 or 12, wherein the frequency control means consist of N oscillators which can be addressed on N frequencies.

14. Transmission system according to claim 11 wherein each emission unit comprises:
  a monofrequency laser producing an emission frequency which is transposed by an acoustooptic modulator in order to produce a deflected and non-deflected beam;
  an optical concentrator for receiving said deflected beam and for outputting a concentrated signal to an amplitude modulator;
  a polarization controller means receiving an output of said amplitude modulator and providing a controlled polarized output to one input of an optical mixer.

* * * * *